United States Patent
Reustle et al.

(10) Patent No.: US 7,011,229 B2
(45) Date of Patent: Mar. 14, 2006

(54) OIL FILLER DEVICE ON AN INTERNAL-COMBUSTION ENGINE

(75) Inventors: Albrecht Reustle, Walheim (DE); Marcus Gaerttling, Heilbronn (DE); Thorsten Wunsch, Wimsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/619,621

(22) Filed: Jul. 16, 2003

(65) Prior Publication Data
US 2004/0026424 A1 Feb. 12, 2004

(30) Foreign Application Priority Data
Aug. 8, 2002 (DE) ............... 102 36 352

(51) Int. Cl.
*B65D 53/00* (2006.01)
(52) U.S. Cl. .............. 220/304; 220/378; 220/86.2; 220/288
(58) Field of Classification Search ........... 220/304, 220/86.1, 86.2, 378, 288
See application file for complete search history.

(56) References Cited

U.S. PATENT DOCUMENTS

| | | | |
|---|---|---|---|
| 4,458,823 A | 7/1984 | Baker | |
| 4,458,824 A | 7/1984 | Johnston et al. | |
| 4,768,677 A * | 9/1988 | Kitsukawa | ........... 220/288 |
| 5,232,115 A | 8/1993 | Bauer | |
| 5,242,075 A | 9/1993 | Ott et al. | |
| 6,213,331 B1 * | 4/2001 | Morgan et al. | ........... 220/295 |

FOREIGN PATENT DOCUMENTS

| | | |
|---|---|---|
| DE | 3311721 | 10/1984 |
| DE | 3927325 A | 2/1991 |
| EP | 0 413 896 | 2/1991 |
| EP | 1092881 A | 4/2001 |
| GB | 2310657 A | 9/1997 |

OTHER PUBLICATIONS
European Search Report dated Oct. 7, 2003.

* cited by examiner

*Primary Examiner*—Robin A. Hylton
(74) *Attorney, Agent, or Firm*—Crowell & Moring LLP

(57) ABSTRACT

An oil filler device on an internal-combustion engine includes a filler neck having an oil filler opening and a closing lid for closing the filler opening. The closing lid has a cup-shaped closing cap which therefore has a bottom and a wall, a sealing device and a centering element interacting with a filler neck. The closing lid is equipped in the center on the bottom with a fastening section constructed as a flange, which fastening section reaches through the centering element and the centering element is fastened on the fastening section. In order to promote a dripping-off of oil situated on the interior side of the closing cap, it is provided that, for the fastening of the centering element on the fastening section, a holding ring is fitted onto the fastening section. The holding ring, on its ring opening, has radially inwardly projecting fastening lugs which extend diagonally with respect to the bottom and are applied to the fastening section. A drip nose extends away from the bottom on the centering element and the centering element rests by its interior circumferential surface flatly against the fastening section and by its exterior circumferential surface flatly against the interior side of the neck.

18 Claims, 1 Drawing Sheet

OIL FILLER DEVICE ON AN INTERNAL-COMBUSTION ENGINE

BACKGROUND AND SUMMARY OF THE INVENTION

This application claims the priority of German Application No. 102 36 352, filed Aug. 8, 2002, the disclosure of which is expressly incorporated by reference herein.

The invention is based on an oil filler device on an internal-combustion engine. Preferred embodiments of the invention relate to an oil filler device on an internal-combustion engine, with a filler neck having an oil filler opening and with a closing lid for closing the filler opening, the closing lid comprising a cup-shaped closing cap which has a bottom and a wall, a sealing device and a centering element interacting with a filler neck, said closing lid being equipped in the center on the bottom with a fastening section constructed as a flange, which fastening section reaches through the centering element and the centering element being fastened on the fastening section.

From European Patent Document EP 413 896 A1 (corresponding U.S. Pat. No. 5,232,115), a type-forming oil filler device is known which has a filler neck with a filler opening and a closing lid closing the filler opening, which closing lid has a cup-shaped closing cap with a bottom and a surrounding wall. A fastening section originates in the center at the bottom on the interior side of the cap, which fastening section reaches through a centering element which is held by means of a locking on the fastening section. A sealing device is arranged on the centering element and interacts with the mouth edge surrounding the filler opening. The centering element rests on the fastening section only in the area of its locking and, in addition, only a line contact exits between the interior side of the filler neck and the centering element. As a result, during the operation of the internal-combustion engine, oil may arrive in larger quantities between the centering element and the interior side of the closing cap.

It is an object of the invention to provide an oil filler device on an internal-combustion engine, in the case of which the closing lid can be manipulated in an easy and clean manner.

This object is achieved according to certain preferred embodiments of the invention by means of an oil filler device on an internal-combustion engine, with a filler neck having an oil filler opening and with a closing lid for closing the filler opening, the closing lid comprising a cup-shaped closing cap which has a bottom and a wall, a sealing device, and a centering element interacting with a filler neck, said closing lid being equipped in the center on the bottom with a fastening section constructed as a flange, which fastening section reaches through the centering element and the centering element being fastened on the fastening section, wherein for the fastening of the centering element on the fastening section, a holding ring is fitted onto the fastening section, wherein the holding ring, on its ring opening, has radially inwardly projecting fastening lugs which extend diagonally with respect to the bottom and are applied to the fastening section, wherein a drip nose extending away from the bottom is constructed on the centering element, and wherein the centering element rests by means of its interior circumferential surface flatly against the fastening section and, by means of its exterior circumferential surface, rests flatly against the interior side of the neck.

Additional features of preferred embodiments of the invention are described herein and in the claims.

Important advantages achieved by means of the invention are that, during the operation of the internal-combustion engine, oil which has reached the interior side of the closing cap can drip by way of the surrounding drip nose back into the filler neck. As a result of the diagonally extending fastening lugs on the holding ring, the oil does not adhere there but can flow back into the filler neck. Thus, no oil can drip off when the closing lid is removed from the oil filler opening, whereby surrounding parts on the internal-combustion engine, particularly the cylinder head cover, remain unsoiled. In some cases, cylinder head covers or other engine parts or the closing lid itself, which were soiled in this manner, were thought to be leaky although they were in fact tight but oil had dripped onto the internal-combustion engine during the removal of a known closing lid. The closing lid according to the invention advantageously avoids this faulty conclusion. Furthermore, the user of the motor vehicle is protected from oil when refilling because no oil can collect on the lid according to the invention. A penetration of oil is largely prevented as a result of the flat contact of the centering element on the interior side of the neck as well as on the fastening section.

A particularly cost-effective embodiment of the closing lid is achieved wherein the holding ring is constructed in one piece as a sheet metal stamped bent component.

The invention will be explained in detail in the following by means of an embodiment with reference to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
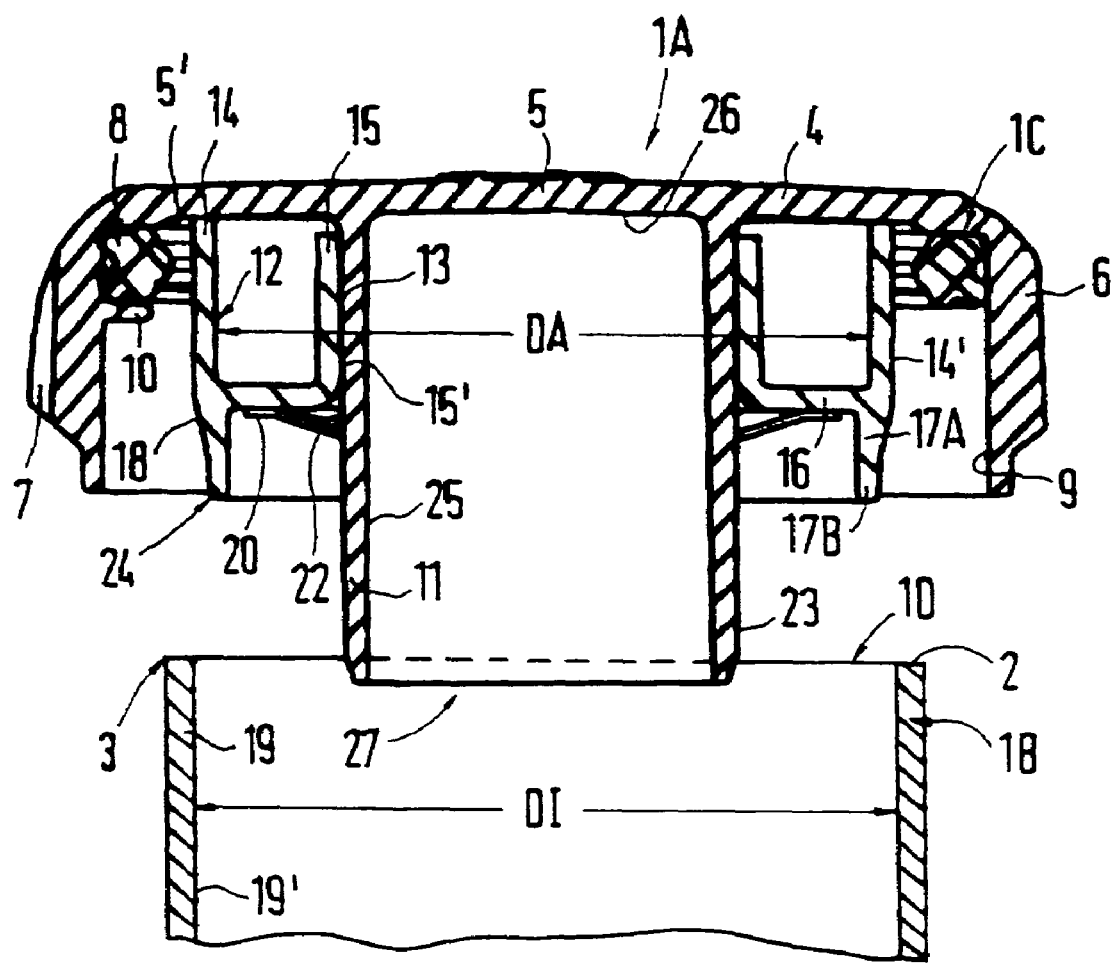
FIG. 1 is a sectional view of a closing lid and a filler neck of an oil filler device, constructed according to a preferred embodiment of the invention.

FIG. 1 illustrates an oil filler device 1A for lubricating oil of an internal-combustion engine, which engine is not shown here in detail. An oil filler device 1A comprises a filler neck 1B and a closing lid 1C which can be fitted onto the neck 1B for closing its oil filler opening 1D. The oil filler opening 1D is surrounded by a mouth edge 2 which is constructed at the end 3 of the tube-shaped neck 1B which may originate from a cylinder head cover of the internal-combustion engine. The oil filler opening 1D is closed by means of the closing lid 1C which is fitted onto the filler neck 1B and is fastened there by means of a fastening device. This fastening device, which is not shown here, may, for example, be formed by an external thread mounted on the oil filler neck and by an internal thread correspondingly mounted on the closing lid. As an alternative, a bayonet catch or another snap-in locking device or clamping lock or the like may be provided.

The closing lid 1C comprises a cup-shaped closing cap 4, which therefore has a disk-shaped bottom 5 as well as an upright and surrounding wall 6 which is connected with the bottom 5 at the end and on which a shaped application element 7 can be mounted on the outside for facilitating manual rotating of the closing lid 1C. Furthermore, the closing lid 1C has a ring-shaped or surrounding sealing device 8 which is inserted into the closing cap 4 and which is supported by way of at least one web 10 projecting from the interior side 9 of the wall 6 or is held on the closing cap 4. On the interior side 9 of the cap 4, particularly at the bottom 5 on the interior side 9, a fastening section 11 is arranged which is constructed as a tube-shaped flange and which extends particularly in the center or in a centered manner on the bottom 5, thus, particularly coaxially to the surrounding wall 6. A centering element 12 is fastened to the fastening section 11, which centering element 12 facilitates the fitting of the closing lid 1C onto the filler neck 1B because it aligns the closing lid 1C on the mouth edge 2. The centering element 12 is therefore adapted by means of its outside diameter DA to the inside diameter D1 of the filler neck 1B and thus to the opening width of the oil filler opening 1D.

In the embodiment shown, the centering element 12 is constructed as a hollow centering ring which is fitted by means of its central ring opening 13 on the tube-shaped fastening section 11 which therefore reaches through the centering element 12. The centering ring is equipped, for example, in a double-walled manner with two mutually spaced and parallel ring walls 14 and 15 which may be connected by way of a base 16 on their end facing away from the bottom 5, so that the centering ring is implemented as having a U-profile in its cross-section, whose profile legs are formed by the ring walls 14 and 15 and are connected by way of the base, which base 16 extends at a distance from the bottom 5 which therefore closes off the U-profile. By means of its exterior circumferential surface 14', the ring wall 14 rests flatly, optionally sealingly, against the inner wall 19' of the neck 1B; the interior circumferential surface 15' of the inner ring wall 15 is flatly, optionally sealingly, in contact with the exterior surface 23 of the fastening section 11. The centering element 12 is preferably constructed in one piece as a plastic part. Furthermore, a surrounding ring collar 17A is constructed on the centering element 12, which ring collar 17A extends from the base 16 away from the bottom 5 and forms an extension of the ring wall 15 and its surface 15'. The ring collar 17A extends, for example, coaxially to the fastening section 11. On its exterior side 18, the ring collar 17A may be constructed to be conically tapering in the direction of its free end 17B in order to facilitate a placing of the covering lid 1C onto the filler neck 1B. The free end 17B of the ring collar 17A preferably projects beyond the wall 6 of the cap 4. When the closing lid 1C is placed onto the filler neck 1B, the tube wall 19 of the neck 1b comes to be situated by means of the mouth edge 2 on the end 3 between the exterior side 18 of the centering element 12 and the sealing device 8. When the lid 1C is fitted on, the mouth edge 2 may rest against the bottom and/or may engage in a groove 5' extending in a surrounding manner on the bottom 5.

Figure 2:
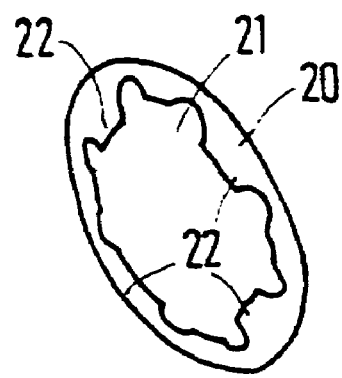
FIG. 2 is a perspective view of a holding ring of the closing lid of FIG. 1.

In order to fasten the centering element 12 on the closing cap 4, a holding ring 20 (FIG. 2) is provided which is pushed onto the fastening section 11, so that the centering element 12 is held by means of the free end of a ring wall 14 and/or 15 against the interior side 9 on the bottom 5 in a captive manner. The centering element 12 can additionally be connected, optionally sealingly, on the interior side 9 with the bottom 5, for example, by gluing or snapping. So that the holding ring 20 is fastened on the fastening section 11, fastening lugs 22 are provided in a distributed manner around the holding ring opening 21, which fastening lugs 22 project radially toward the inside and are applied to the exterior surface 23 of the fastening section 11, particularly in the manner of a barb. The fastening lugs 22 may, for example, be resiliently supported on the fastening section 11 and/or may dig themselves into the material of the fastening section 11, so that a force- and/or form-locking connection is established between the holding ring 20 and the fastening section 11. In addition, the fastening lugs 22 may extend diagonally; that is, be aligned in the direction away from the bottom 5. In addition, the holding ring 20 is provided with an outside diameter such that it comes to be situated between the ring collar 17A and the fastening section 11 on the base 16; and is therefore arranged within the ring collar 17A.

In order to let oil reaching the interior side 9 of the cap during the operation of the internal-combustion engine drip off there again, the ring collar 17A acts as a drip nose 24 as a result of its axial course directed away from the bottom 5. Oil flows on the drip nose 24 downward to the free end 17B and can drip off from there into the neck 1B. The fastening lugs 22 on the holding ring 20 extend at an angle with respect to the base 16, thus directed away from the bottom 5, so that oil can flow in the direction of the fastening section 11 and from there, along the outer surface 23, back into the neck 1B. The holding ring 20 with its fastening lugs 22 is produced, particularly in one piece, as a sheet metal stamped or bent component, for example, of an elastic material, particularly steel.

In order to avoid a collection of oil on the interior side 25 of the fastening section 11 or on the bottom area 26 of the interior cap side 9 bordered by the fastening section 11, the open end 27 of the tube-shaped fastening section 11 may be closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Oil filler device on an internal-combustion engine, with a filler neck having an oil filler opening and with a closing lid for closing the filler opening, the closing lid comprising:
    a cup-shaped closing cap which has a bottom and a wall,
    a sealing device, and
    a centering element interacting with a filler neck,
    said closing lid being equipped in the center on the bottom with a fastening section constructed as a flange, which fastening section extends through the centering element with the centering element being fastened on the fastening section;
    wherein, for the fastening of the centering element on the fastening section, a holding ring is fitted onto the fastening section,
    wherein the holding ring, on a ring opening, has radially inwardly projecting fastening lugs which extend diagonally with respect to the bottom and are applied to the fastening section,
    wherein a drip nose extending away from the bottom is constructed on the centering element, and
    wherein the centering element rests by means of its interior circumferential surface flatly against the fastening section and, by means of its exterior circumferential surface, rests flatly against the interior side of the filler neck whereby there is an engaging relationship between the closing lid and the filler opening when the closing lid is applied to the filler neck.

2. Closing lid according to claim 1, wherein the centering element is implemented as a centering ring and has a U-shaped cross-section with two profile legs, a first profile leg on an interior side of the filler neck and a second leg being adjacent to the fastening section and a base being spaced away from the bottom.

3. Closing lid according to claim 2, wherein the holding ring rests on the base.

4. Closing lid according to claim 1, wherein the holding ring is constructed in one piece as a sheet metal stamped or bent component.

5. Closing lid according to claim 2, wherein the holding ring is constructed in one piece as a sheet metal stamped or bent component.

6. Closing lid according to claim 3, wherein the holding ring is constructed in one piece as a sheet metal stamped or bent component.

7. Closing lid according to claim 1, wherein the holding ring is situated inside a ring collar of the centering element.

8. Closing lid according to claim 2, wherein the holding ring is situated inside a ring collar of the centering element.

9. Closing lid according to claim 3, wherein the holding ring is situated inside a ring collar of the centering element.

10. Closing lid according to claim 4, wherein the holding ring is situated inside a ring collar of the centering element.

11. Closing lid according to claim 1, wherein the holding ring consists of spring steel.

12. A multipart closing lid operable to selectively close an oil filler opening at a filler neck for an internal combustion engine, comprising:
   a cup-shaped closing cap having a bottom wall, an annular wall connected to a periphery of the bottom wall, and an annular fastening section connected to a central area of the bottom wall,
   a centering element surrounding the fastening section, said centering element in use interacting with the filler neck to center the closing cap on the filler neck, and
   a holding ring operable to hold the centering element on the fastening section,
   wherein a drip nose extending away from the bottom is constructed on the centering element,
   wherein the centering element rests by means of its interior circumferential surface flatly against the fastening section and, by means of its exterior circumferential surface, rests flatly against the interior side of the neck,
   wherein the centering element is implemented as a centering ring and has a U-shaped cross-section, a profile leg of an interior side of the neck and the other leg being adjacent to the fastening section and a base being spaced away from the bottom, and
   wherein the holding ring rests on the base whereby there is an engaging relationship between the closing lid and the filler opening when the closing lid is applied to the filler neck.

13. A multipart closing lid operable to selectively close an oil filler opening at a filler neck for an internal combustion engine, comprising:
   a cup-shaped closing cap having a bottom wall, an annular wall connected to periphery of the bottom wall, and an annular fastening section connected to a central area of the bottom wall,
   a centering element surrounding the fastening section, said centering element in use interacting with the filler neck to center the closing cap on the filler neck, and
   a holding ring operable to hold the centering element on the fastening section,
   wherein a drip nose extending away from the bottom is constructed on the centering element,
   wherein the centering element rests by means of its interior circumferential surface flatly against the fastening section and, by means of its exterior circumferential surface, rests flatly against the interior side of the neck, and
   wherein the holding ring is constructed in one piece as a sheet metal stamped or bent component whereby there is an engaging relationship between the closing lid and the filler opening when the closing lid is applied to the filler neck.

14. A closing lid according to claim 12, wherein the holding ring is constructed in one piece as a sheet metal stamped or bent component.

15. A closing lid according to claim 12, wherein the holding ring is constructed in one piece as a sheet metal stamped or bent component.

16. A closing lid according to claim 12, wherein the holding ring is situated inside a ring collar of the centering element.

17. A closing lid according to claim 12, wherein the holding ring is situated inside a ring collar of the centering element.

18. A closing lid according to claim 12, wherein the holding ring consists of spring steel.

* * * * *